United States Patent [19]
Aoki et al.

[11] Patent Number: 5,713,198
[45] Date of Patent: Feb. 3, 1998

[54] EXHAUST GAS-PURIFYING DEVICE FOR INTERNAL COMBUSTION ENGINES

[75] Inventors: Takuya Aoki; Yuichi Shimasaki; Takashi Komatsuda; Hiroaki Kato; Akihisa Saito; Toshikazu Oketani, all of Wako, Japan

[73] Assignee: Honda Giken Kogyo Kabushiki Kaisha, Tokyo, Japan

[21] Appl. No.: 728,977

[22] Filed: Oct. 11, 1996

Related U.S. Application Data

[62] Division of Ser. No. 391,029, Feb. 21, 1995.

[30] Foreign Application Priority Data

Feb. 25, 1994 [JP] Japan ................................ 6-052669

[51] Int. Cl.$^6$ ................................................ F01N 3/20
[52] U.S. Cl. ............................ 60/277; 60/284; 60/300
[58] Field of Search .......................... 60/297, 277, 300

[56] References Cited

U.S. PATENT DOCUMENTS 5,271,906  12/1993  Yuuki et al. .
5,379,586  1/1995  Honji et al. .
5,537,321  7/1996  Yoshizaki ................................ 60/284

FOREIGN PATENT DOCUMENTS 4-105925  9/1992  Japan .

*Primary Examiner*—Douglas Hart
*Attorney, Agent, or Firm*—Nikaido Marmelstein Murray & Oram LLP

[57] ABSTRACT

An exhaust gas-purifying device for an internal combustion engine has an adsorbing device arranged in an exhaust passage of the engine for adsorbing unburnt fuel components in exhaust gases from the engine, a catalytic converter arranged in same at a location downstream of the adsorbing device for purifying the exhaust gases, and a heater for electrically heating the catalytic converter. The temperature of the adsorbing device is detected. The heater is controlled to be operated at least on condition that the temperature of the adsorbing device is above a predetermined value. In another form of the invention, the temperature of the catalytic converter is detected. A rate of a rise of the temperature of the catalytic converter is determined. A deterioration state of the adsorbing device is determined based on the rate of the rise of the temperature of the catalytic converter.

3 Claims, 3 Drawing Sheets

EXHAUST GAS-PURIFYING DEVICE FOR INTERNAL COMBUSTION ENGINES

This is a divisional of application Ser. No. 08/391,029 filed on Feb. 21, 1995

BACKGROUND OF THE INVENTION

1. Field of the Invention

This invention relates to an exhaust gas-purifying device for internal combustion engines, which includes an adsorbing device arranged in an exhaust passage of the engine for adsorbing unburnt fuel components contained in exhaust gases from the engine.

2. Prior Art

A catalytic converter, which is arranged in an exhaust passage of an internal combustion engine for purifying exhaust gases, is not fully activated in a low engine temperature condition, e.g. immediately after the start of the engine. This can result in degraded exhaust emission characteristics due to unburnt fuel components being emitted without being burnt in combustion chambers of the engine.

To solve the problem, an exhaust gas-purifying device has already been proposed by Japanese Provisional Utility Model Publication (Kokai) No. 4-105925, which is comprised of an adsorbing device arranged in an exhaust passage of the engine for adsorbing unburnt fuel components, and a catalytic converter equipped with a heater, which is arranged in the exhaust passage at a location downstream of the adsorbing device.

The adsorbing device arranged in the exhaust passage generally has such operating characteristics that it adsorbs unburnt fuel components when the temperature thereof is low, while it releases or desorbs the unburnt fuel components adsorbed thereby when the temperature thereof rises to a predetermined level. In the proposed conventional exhaust gas-purifying device, however, the timing of start of energization of the heater is set irrespective of expected timing of start of release of the unburnt fuel components from the adsorbing device, and as a result, in some cases, the heater starts to be operated too early. This leaves room for improvement in respect of reduction of the consumption of power of a battery for supplying electric power to the heater.

Further, the conventional exhaust gas-purifying device does not take into account deterioration of the adsorbing device due to aging etc., and hence an aged or deteriorated adsorbing device can be undesirably used in spite of its degraded performance, thereby degrading exhaust emission characteristics of the engine.

SUMMARY OF THE INVENTION

It is a first object of the invention to provide an exhaust gas-purifying device which is capable of reducing the power consumption through proper control of the operation of a heater provided for a catalytic converter arranged in the exhaust system of the engine at a location downstream of an adsorbing device.

It is a second object of the invention to provide an exhaust gas-purifying device which is capable of detecting deterioration of the adsorbing device.

To attain the first object, according to a first aspect of the invention, there is provided an exhaust gas-purifying device for an internal combustion engine having an exhaust passage, the exhaust gas-purifying device including adsorbing means arranged in the exhaust passage, for adsorbing unburnt fuel components in exhaust gases from the engine, purifying means arranged in the exhaust passage at a location downstream of the adsorbing means and having a catalyst for purifying components of the exhaust gases, and heater means for electrically heating the catalyst of the purifying means.

The exhaust gas-purifying device according to the first aspect of the invention is characterized by comprising:
 adsorbing means temperature-detecting means for detecting temperature of the adsorbing means; and
 control means for causing the heater means to be operated at least on condition that the temperature of the adsorbing means detected by the adsorbing means temperature-detecting means is above a predetermined value.

Preferably, the exhaust gas-purifying device includes purifying means temperature-detecting means for detecting temperature of the purifying means, and the control means causes the heater means to be operated on condition that the temperature of the purifying means detected by the purifying means temperature-detecting means is below a predetermined value.

Preferably, the exhaust gas-purifying device includes time period-measuring means for measuring a time period elapsed after the engine is started, and the control means causes the heater means to be operated on condition that the time period measured by the time period-measuring means falls within a predetermined time period.

More preferably, the exhaust gas-purifying device includes time period-measuring means for measuring a time period elapsed after the engine is started, and wherein the control means causes the heater means to be operated on condition that the time period measured by the time period-measuring means falls within a predetermined time period.

To attain the second object, according to a second aspect of the invention, there is provided an exhaust gas-purifying device for an internal combustion engine having an exhaust passage, the exhaust gas-purifying device including adsorbing means arranged in the exhaust passage, for adsorbing unburnt fuel components in exhaust gases from the engine, and purifying means arranged in the exhaust passage at a location downstream of the adsorbing means and having a catalyst for purifying components of the exhaust gases.

The exhaust gas-purifying device according to the second aspect of the invention is characterized by comprising:
 purifying means temperature-detecting means for detecting temperature of the purifying means;
 temperature rise rate-determining means for determining a rate of rise of the temperature of the purifying means detected by the purifying means temperature-detecting means; and
 deterioration-determining means for determining a deterioration state of the adsorbing means based on the rate of the temperature rise of the purifying means determined by the temperature rise rate-determining means.

Preferably, the exhaust gas-purifying device includes adsorbing means temperature-detecting means for detecting temperature of the adsorbing means. The temperature rise rate-determining means determines the rate of the temperature rise of the purifying means when the temperature of the adsorbing means detected by the adsorbing means temperature-detecting means for detecting temperature of the adsorbing means is low.

More preferably, the exhaust gas-purifying device includes heater means for electrically heating the catalyst of the purifying means. The temperature rise rate-determining means determines the rate of the temperature rise of the purifying means when the heater means is being operated after the start of the engine.

The above and other objects, features, and advantages of the invention will become more apparent from the following detailed description taken in conjunction with the accompanying drawings.

DETAILED DESCRIPTION

Next, the invention will now be described in detail with reference to drawings showing an embodiment thereof.

Figure 1:
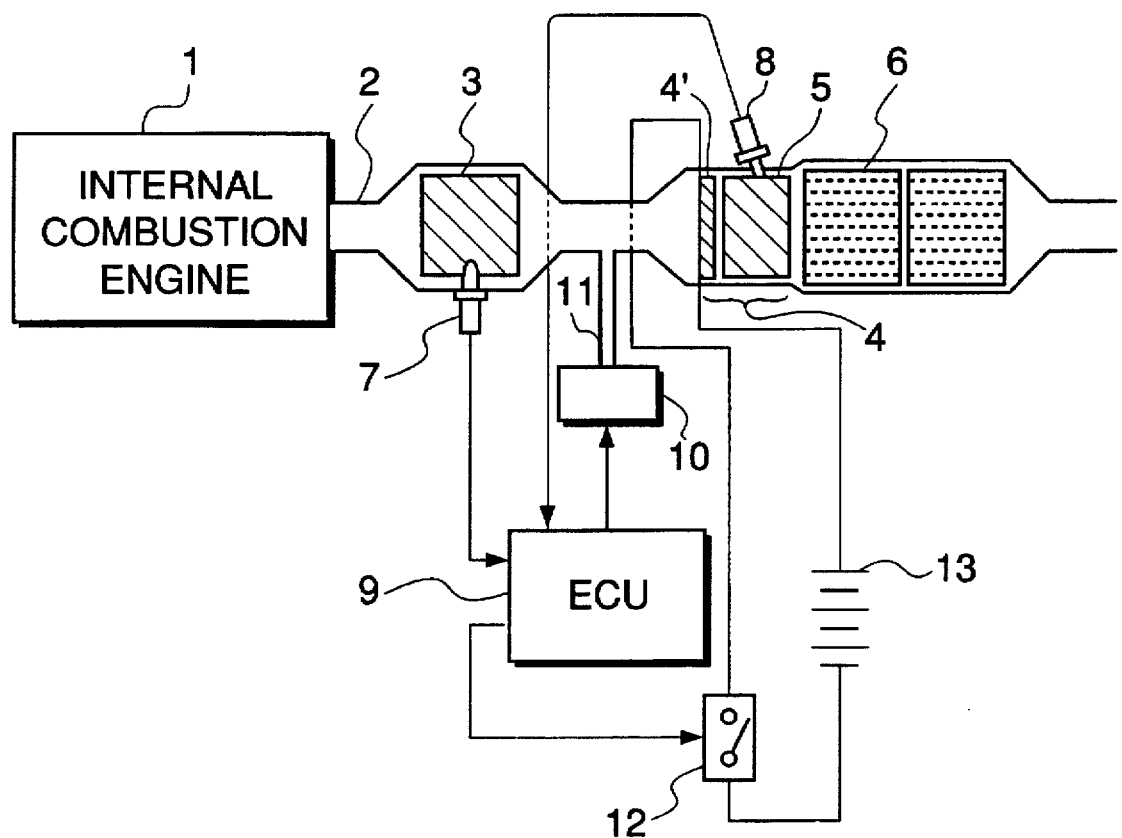
FIG. 1 is a block diagram showing the whole arrangement of an exhaust gas-purifying device according to an embodiment of the invention.

FIG. 1 schematically shows an internal combustion engine (hereinafter simply referred to as "the engine") and an exhaust gas-purifying device used therein. In the figure, reference numeral 1 designates the internal combustion engine which has an exhaust passage 2 having arranged therein an adsorbing device 3 for adsorbing unburnt fuel components (HC components) in exhaust gases from the engine, a heater-equipped catalytic converter (hereinafter referred to as "the EHC") 4 which is comprised of a small-sized light-off catalyst 5 for purifying exhaust gases generated immediately after the start of the engine and a heater 4' for electrically heating the catalyst 5, and a three-way catalyst 6 for purifying noxious components such as HC, CO and NOx contained in the exhaust gases.

The adsorbing device 3 has a TADS temperature sensor inserted 7 therein for detecting the temperature TADS of the adsorbing device 3, and a signal indicative of the sensed temperature TADS is supplied to an ECU (electronic control unit) 9. Further, the EHC 4 has a TEHC temperature sensor 8 for detecting the temperature TEHC of the EHC 4, and a signal indicative of the sensed temperature TEHC is also supplied to the ECU 9.

The heater 4' of the EHC 4 has one end thereof connected to a negative electrode of a battery 13 via a switch 12, and the other end thereof directly connected to a positive electrode of the battery 13. The switch 12 has its ON/OFF operation controlled by a control signal from the ECU 9.

A secondary air supply device 10 is connected to the exhaust passage 2 at a location intermediate between the adsorbing device 3 and the EHC 4 via a conduit 11. The secondary air supply device 10 operates to supply fresh air into the exhaust passage 2. The secondary air supply device 10 is electrically connected to the ECU 9 to have its operation controlled by a signal from the ECU 9.

The adsorbing device 3 has an adsorbent which is formed e.g. of zeolite, contained therein, which adsorbs unburnt fuel components when the temperature thereof is below a predetermined value (e.g. approximately 200° C.), but it releases or desorbs the adsorbed unburnt fuel components (purging) when the temperature thereof exceeds the predetermined value.

The ECU 9 is comprised of an input circuit having the functions of shaping the waveforms of input signals from various sensors including the temperature sensors 3 and 4 mentioned above, shifting the voltage levels of sensor output signals to a predetermined level, converting analog signals from analog-output sensors to digital signals, and so forth, a central processing unit (hereinafter referred to as the "the CPU"), memory means storing various operational programs which are executed by the CPU, and for storing results of calculations therefrom, etc., and an output circuit which outputs driving signals to the secondary air supply device 10, the switch 12, etc.

Figure 2:
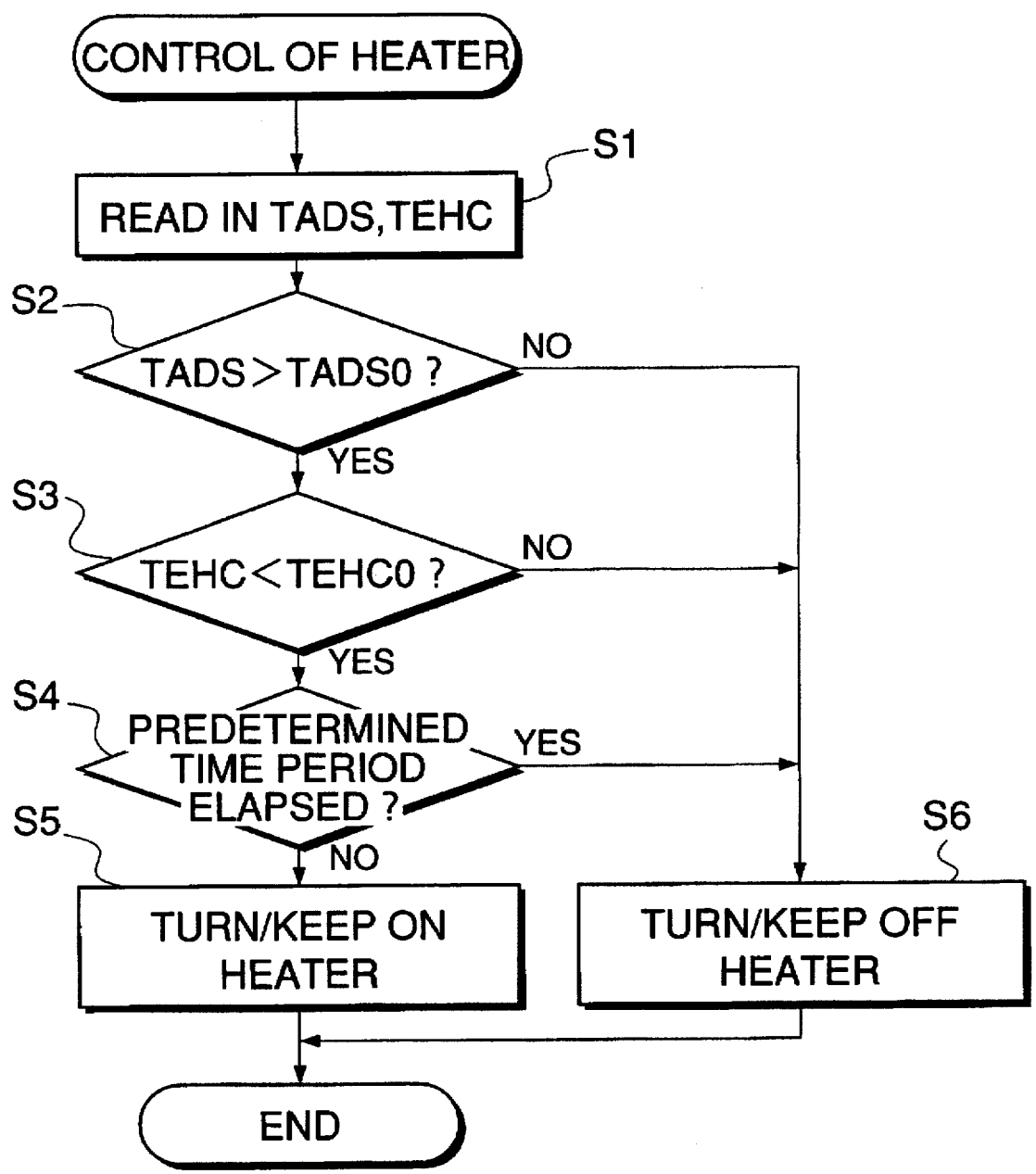
FIG. 2 is a flowchart of a program for controlling energization of a heater of a heater-equipped catalytic converter.

FIG. 2 shows a program for controlling ON/OFF operation of the switch 12, i.e. energization of the EHC 4, which is executed by the ECU 9. The processing according to this program is executed e.g. at regular time intervals immediately after the start of the engine.

First, at a step S1, the temperature TADS of the adsorbing device 3 and the temperature TEHC of the EHC 4 are read in, and it is determined at a step S2 whether or not the temperature TADS is higher than a predetermined value TADS0. If TADS≦TADS0 holds, i.e. if the temperature TADS of the adsorbing device 3 is low, the heater 4' is deenergized by turning the switch 12 off at a step S6, while if TADS>TADS0 holds, it is further determined at a step S3 whether or not the temperature TEHC of the EHC 4 is below a predetermined value TEHC0 (e.g. 350° C.). If TEHC≧TEHC holds, i.e. if the temperature TEHC of the EHC 4 is high, the heater 4' is deenergized at the step S6, whereas if TEHC<TEHC0 holds, it is further determined at a step S4 whether or not a predetermined time period (e.g. 60 seconds) has elapsed after the engine 1 was started. If the answer to this question is negative (NO), the program proceeds to a step S5, wherein the heater 4' is energized by turning the switch 12 on, whereas if the answer is affirmative (YES), the program proceeds to the step S6, wherein the heater 4' is deenergized.

The predetermined temperature TADS0 should be lower than a temperature at which the adsorbing device 3 starts to release the HC components adsorbed therein, which is determined by taking into consideration a time period over which the EHC 4 and the catalysts 5, and 6 can be activated before the start of release of the HC components if the heater 4' is energized when TADS>TADS0 becomes satisfied. For example, it is set to a temperature of approximately 150° C.

The present embodiment is based on the fact that the EHC 4 is only required to become activated just before the start of release of the HC components by the adsorbing device 3. According to the embodiment, when the temperature TEHC of the EHC 4 is low (TEHC<TEHC0) at the start of the engine, energization of the heater 4' of the EHC 4 is started at retarded suitable timing as compared with the conventional exhaust gas-purifying device in which energization of the heater is started immediately after the start of the engine, thereby making it possible to reduce the power consumption by the heater to the minimum.

Figure 3:
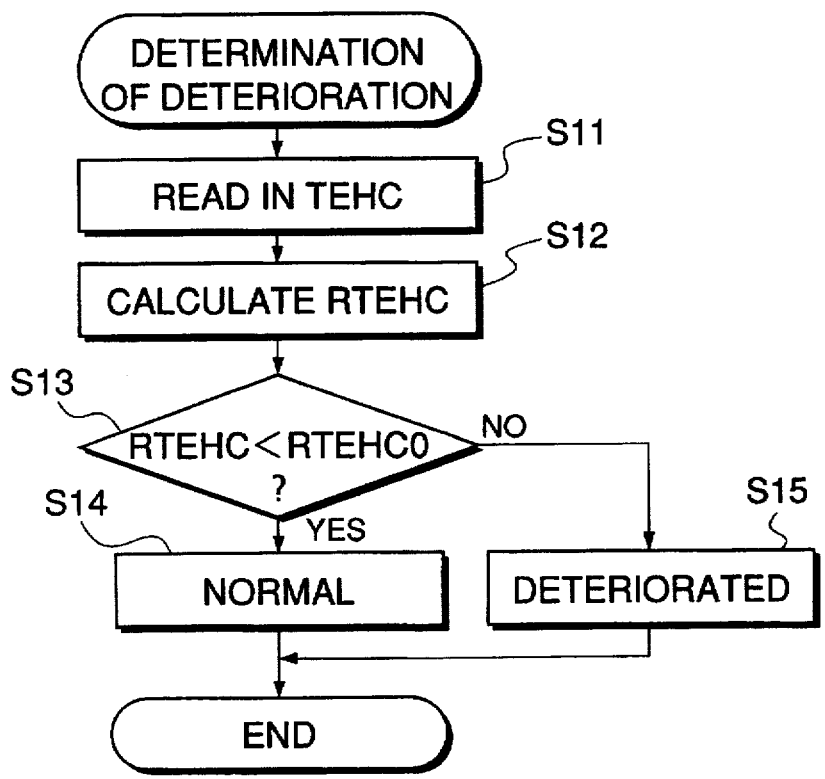
FIG. 3 is a flowchart of a program for determining aging or deterioration of an adsorbing device.

FIG. 3 shows a program for determining deterioration of the adsorbing device 3, which is executed by the ECU 9. The processing according to this program is executed e.g. at regular time intervals immediately after the start of the engine.

Figure 4:
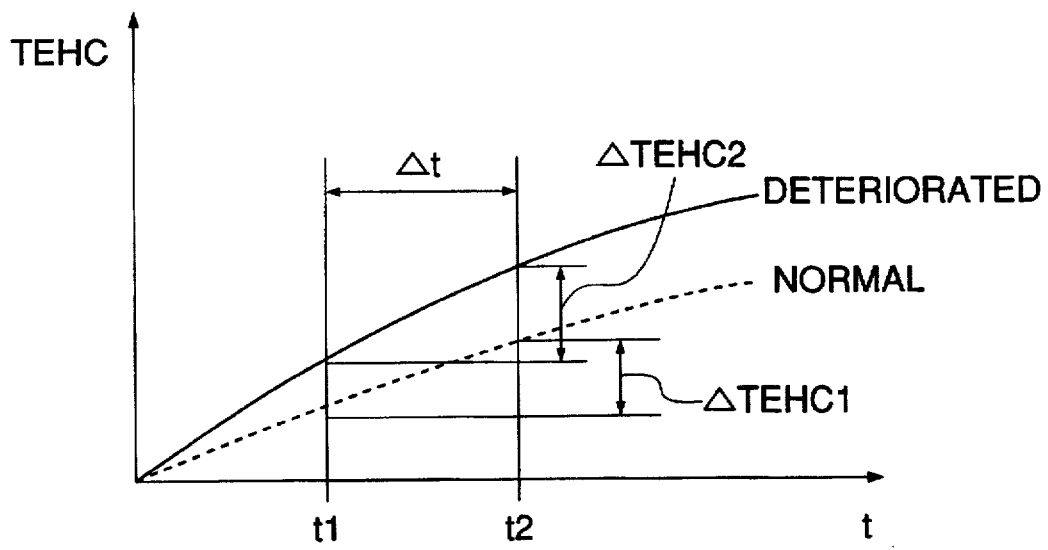
FIG. 4 is a diagram which is useful in explaining a manner of determination of deterioration of the adsorbing device.

First, at a step S11, the temperature TEHC of the EHC 4 is read in, and then a temperature rise rate RTEHC is calculated at a step S12 by the use of the following equation:

$$RTEHC = (TEHC(t2) - TEHC(t1))/(t2-t1)$$

where (t2) and (t1) represent values of the temperature TEHC detected at time points t2 and t1, respectively (see FIG. 4).

Then, it is determined at a step S13 whether or not the temperature rise rate RTEHC is smaller than a predetermined value RTEHC0. If RTEHC<RTEHC0 holds, it is determined at a step S14 that the adsorbing device 3 is normally functioning, whereas if RTEHC≧RTEHC0 holds, it is determined at a step S15 that the adsorbing device 3 is deteriorated.

The above determinations are based on the following finding: If the adsorbing device 3 is normally functioning, an amount of the HC components in exhaust gases flowing through the EHC 4 is small when the temperature of the adsorbing device 3 is so low that no adsorbed HC components are released therefrom, and hence an amount of heat generated by oxidation of the HC components in the EHC 4 is small. Consequently, the temperature rise rate RTEHC (=$\Delta$TEHC1/$\Delta$t) exhibited by the EHC 4 is small. In contrast, if the adsorbing device 3 is aged or deteriorated, the amount of the HC components in exhaust gases flowing through the EHC 4 is large even when the temperature of the adsorbing device 3 is low, so that the amount of heat generated by oxidation of the HC components in the EHC 4 is large. Consequently, the temperature rise rate RTEHC (=$\Delta$TEHC2/$\Delta$t) exhibited by the EHC 4 is large (see FIG. 4). Therefore, when the temperature rise rate RTEHC is larger than the predetermined value RETCH0, it can be determined that the adsorbing device 3 is deteriorated.

As can be understood from the above, it is preferred that the processing for determination of deterioration of the adsorbing device 3 should be executed when the temperature TADS of the adsorbing device 3 is low (i.e. before the adsorbed unburnt fuel components start to be released therefrom). The determination is preferably executed when the heater 4' of the EHC 4 is being energized.

According to the present embodiment, it is possible to detect deterioration of the adsorbing device 3, whereby countermeasures can be properly taken to maintain good exhaust emission characteristics of the engine.

Although in the above embodiment, the TEHC temperature sensor 8 mounted in the EHC 4 is used as a catalyst temperature sensor for detecting the temperature of the catalyst, this is not limitative, but a sensor for detecting the temperature of the three-way catalyst 6 may be provided and used as the catalyst temperature sensor.

What is claimed is:

1. In an exhaust gas-purifying device for an internal combustion engine having an exhaust passage, said exhaust gas-purifying device including adsorbing means arranged in said exhaust passage, for adsorbing unburnt fuel components in exhaust gases from said engine, and purifying means arranged in said exhaust passage at a location downstream of said adsorbing means and having a catalyst for purifying components of said exhaust gases;

the improvement comprising:

purifying means temperature-detecting means for detecting temperature of said purifying means;

temperature rise rate-determining means for determining a rate of rise of the temperature of said purifying means detected by said purifying means temperature-detecting means; and deterioration-determining means for determining a deterioration state of said adsorbing means based on said rate of said temperature rise of said purifying means determined by said temperature rise rate-determining means.

2. An exhaust gas-purifying device according to claim 1, including adsorbing means temperature-detecting means for detecting temperature of said adsorbing means, and wherein said temperature rise rate-determining means determines said rate of said temperature rise of said purifying means when the temperature of said adsorbing means detected by said adsorbing means temperature-detecting means for detecting temperature of said adsorbing means is low.

3. An exhaust gas-purifying device according to claim 2, including heater means for electrically heating said catalyst of said purifying means, and wherein said temperature rise rate-determining means determines said rate of said temperature rise of said purifying means when said heater means is being operated after the start of said engine.

* * * * *